(12) United States Patent
Knee

(10) Patent No.: US 8,860,880 B2
(45) Date of Patent: Oct. 14, 2014

(54) OFFSET INTERPOLATION OF A SEQUENCE OF IMAGES TO OBTAIN A NEW IMAGE

(71) Applicant: Snell Limited, Berkshire (GB)

(72) Inventor: Michael James Knee, Petersfield (GB)

(73) Assignee: Snell Limited, Reading, Berkshire (GB)

( * ) Notice: Subject to any disclaimer, the term of this patent is extended or adjusted under 35 U.S.C. 154(b) by 0 days.

(21) Appl. No.: 13/948,887

(22) Filed: Jul. 23, 2013

(65) Prior Publication Data

US 2014/0028911 A1    Jan. 30, 2014

(30) Foreign Application Priority Data

Jul. 24, 2012   (GB) .................................. 1213158.7

(51) Int. Cl.
*H04N 7/01*       (2006.01)
*H04N 9/64*       (2006.01)
*G06T 3/40*       (2006.01)

(52) U.S. Cl.
CPC ............... *H04N 7/0135* (2013.01); *G06T 3/40* (2013.01); *H04N 7/0127* (2013.01); *H04N 7/014* (2013.01)
USPC ............................. 348/441; 348/459; 348/607

(58) Field of Classification Search
CPC ........... H04N 7/01; H04N 7/012; H04N 7/50; H04N 7/26244; H04N 7/68; H04N 7/0135; G09G 2310/02; G09G 2320/02; G09G 2340/04; G09G 2340/0421
USPC ............ 348/441, 607, 459, 618–20; 345/589; 375/240.16, 240.27
See application file for complete search history.

(56) References Cited

U.S. PATENT DOCUMENTS

| | | | | |
|---|---|---|---|---|
| 2005/0237429 | A1* | 10/2005 | Grundmeyer et al. | 348/510 |
| 2009/0135913 | A1* | 5/2009 | Nair et al. | 375/240.16 |
| 2009/0195691 | A1* | 8/2009 | Wyman | 348/452 |
| 2009/0244365 | A1* | 10/2009 | Takeda et al. | 348/441 |
| 2010/0046623 | A1* | 2/2010 | Chen et al. | 375/240.16 |
| 2011/0211075 | A1* | 9/2011 | Riemens et al. | 348/180 |

FOREIGN PATENT DOCUMENTS

| | | |
|---|---|---|
| EP | 0294958 | 12/1988 |
| GB | 2268659 | 1/1994 |
| GB | 2500909 | 10/2013 |
| GB | 2502047 | 11/2013 |
| WO | 01/74082 | 10/2001 |
| WO | 2004/025958 | 3/2004 |
| WO | 2005/096632 | 10/2005 |
| WO | 2011/073693 | 6/2011 |

OTHER PUBLICATIONS

United Kingdom Patent Application No. GB 1213158.7 Search Report, dated Dec. 1, 2012 (1 page).

* cited by examiner

*Primary Examiner* — Victor Kostak
(74) *Attorney, Agent, or Firm* — Michael Best & Friedrich LLP

(57) ABSTRACT

Apparatus for interpolating images generates motion vectors having a vector confidence value and has a motion compensated interpolation to use the motion vectors to interpolate a new image from two input images at a position determined by a phase control signal. The vector confidence values are used to generate an interpolation confidence measure. The phase control signal is then modified to offset the position at which the new image is interpolated toward the position of the closer of the two input images, if said interpolation confidence measure reduces.

17 Claims, 4 Drawing Sheets

OFFSET INTERPOLATION OF A SEQUENCE OF IMAGES TO OBTAIN A NEW IMAGE

FIELD OF INVENTION

This invention concerns the interpolation of new images within a sequence of images.

BACKGROUND OF THE INVENTION

It is frequently necessary to interpolate a new image at some position within a sequence of images that does not align with an existing image in the sequence. A very common example is temporal interpolation. Temporal interpolation is performed whenever a representation of a video frame is required corresponding to a time instant that is not present in the input sequence. Examples of applications of temporal interpolation include: conversion of a video sequence to a new frame or field rate without changing the speed of any motion present in the scene, slow-motion effects where additional frames are created for playout at the original frame rate, or any combination of those processes that does not amount to simply playing out the input frames one by one at a different rate.

Another application of interpolation within a image sequence is where the sequence comprises a sequence of views of a common scene from different positions, and an interpolated image is created that represents the view of the scene from a position between two of the existing viewpoints. In this specification temporal interpolation will be described, however the skilled person will appreciate that the invention is equally applicable to ordered image sequences in general.

In this specification the term 'position' will be used to describe the position of an image in an ordered sequence of images. This may be a position in time or a position in whatever dimension defines the relationship between the images of the sequence; for example it could be a sequence of viewpoints along a path, which may or may not have associated time values. To avoid confusion, the term 'spatial position' will be used to indicate position within an image.

Examples of known techniques for temporal interpolation will now be described. FIG. 1 shows one-dimensional sections through frames in a sampled video sequence with time running horizontally in the diagram. Frames 101 and 102 are input frames, and frame 103 represents an output frame interpolated at a time instant 60% of the input frame period after the first input frame. In the remainder of this document, the desired output frame time is specified relative to the times of the two adjacent input frames as "display phase" on a scale from 0 to 1. Typically a regular sequence of output images is required, and, as is well known in the art, the display phase of each interpolated output image will differ from the display phase of the preceding interpolated output image by a phase increment that depends on the difference between the temporal sampling rates of the input and output image sequences.

In this example, the display phase is 0.6. In "non-motion-compensated" interpolation, a particular sample (pixel) (104) of the output frame may be derived from corresponding samples (105) and (106) in the input frames. Suitably, linear interpolation would be used, in which the value of output sample (104) would be equal to the sum of 40% of input sample (105) and 60% of input sample (106).

Linear interpolation as shown in FIG. 1 gives acceptable results unless there is significant movement of detailed objects in the scene; in this case the output frames become blurred, or a double image becomes apparent, as the result of the relatively-displaced contributions from the two input frames.

Motion compensated interpolation, illustrated in FIG. 2, is a well known way of overcoming those problems. Referring to FIG. 2, pixel (205) in input frame 201 has associated with it a forward motion vector (207). Similarly, pixel (206) in input frame 202 has associated with it a backward motion vector (208). Both input pixels are 'projected' onto the interpolated output frame 203 in the direction of their respective motion vectors, and contribute through a weighted sum or other method to the value of pixel (204) in the output frame.

In the projection of pixels from their respective spatial positions in input frames to their motion compensated spatial positions in output frames, the magnitudes of the respective motion vectors are scaled in proportion to the phase difference between the output frame and the respective contributing input frame. Thus input pixel (205) is shifted by 0.6 of the motion vector (207); and, input pixel (206) is shifted by 0.4 of the motion vector (208). Various methods exist to solve the problems that arise when particular output pixel locations either have no motion vectors pointing to them, or have vectors pointing to them from more than one location in an input frame. For example, International Patent Application No. WO 2004/025958 "Improved Video Motion Processing" describes a method of assigning weights to contributing pixels.

Occasionally, a frame 'built' by motion compensation may suffer from impairments. These can arise, for example: where the speed or complexity of the motion in the scene is too high for the motion estimator; where there is a significant incidence of transparent content in the scene; where there are significant changes in illumination between one frame and the next; or, where the input frames are corrupted by noise. Such impairments may sometimes be more annoying than the blur or double images produced by linear interpolation. For this reason, motion compensated interpolation systems may employ "fallback processing" in which a linearly interpolated value may be switched or mixed into the output in response to a confidence measure.

FIG. 3 illustrates a motion compensated temporal interpolator employing fallback processing. An input video signal (301) is applied to a motion compensated interpolation process (302) to produce a motion compensated output (303). The time of the output frame is determined by the display phase signal (311). A confidence measurement process (304) uses the input signal (301) and information (305) from the motion compensation process (302) to generate a switching signal (306). A linear interpolation process (307) is also carried out on the input signal (301) in accordance with the display phase (311) to produce linearly interpolated fallback frames (308). A mixing unit (309) mixes between the motion compensated interpolated frames (303) and the fallback frames (308) according to the switching signal (306) to produce a final output (310). The confidence measurement may be: pixel based, in which case the switching signal has high bandwidth; region based, in which case the switching or mixing signal has a lower bandwidth; or, frame based, in which a uniform decision about the degree of fallback processing is made across the whole frame.

Fallback processing using linear interpolation can be satisfactory but has several potential drawbacks. If, on the one hand, the control signal has too high a bandwidth, the artefacts introduced by the switching process can sometimes be more disturbing than the original artefacts. If, on the other hand, the control signal has low bandwidth, significant areas of the picture may be processed using the linear fallback mode when they would have benefited from motion compensated processing. Furthermore, linearly interpolated pictures, while sometimes acceptable in real-time display, show obvious impairments if individual frames of the output are viewed in isolation.

An alternative method of fallback processing is taught in International Patent Application WO 2011/073693. This method is applicable where the change in frame rate desired in the converter is small, for example when converting from 24 Hz film to 25 Hz video. The fallback processing, switched in when confidence in the motion estimation is low, consists of playing out input frames synchronized to the output frame rate, a process which can be maintained without dropping or repeating frames, for a limited time depending on the capacity of a frame-store buffer in the system. This method can be very effective, producing an unimpaired fallback signal, but is limited to close-frame-rate conversion and to short-lived dips in the level of confidence.

SUMMARY OF THE INVENTION

The invention consists in a method and apparatus for interpolating an ordered sequence of input images to obtain a new image at a required position in the sequence that does not align with an input image wherein interpolation-related impairments are reduced by interpolating at least part of the said new image at a position that is offset from the required position.

Suitably, the interpolated images are presented to an observer in a regular sequence and at least part of an interpolated output image is interpolated at a position that is offset from its presented position.

In certain embodiments the said interpolation is temporal interpolation.

Advantageously, the direction of the said offset is towards the input image that is nearest to the said required position of the interpolated output image.

In a preferred embodiment the said offset is reduced in dependence on the proximity of the said nearest input image to the said required position of the interpolated output image.

Advantageously, the magnitude of the offset depends on a measure of interpolation confidence generated using information from a temporal interpolation or motion estimation process.

The offset may be constant across each interpolated output image. Or, the offset may vary smoothly over each interpolated output image in dependence on spatial position within the output image.

Accordingly, the inventor has recognized that there is a hitherto unexplored aspect to fallback processing, namely the trade-off between motion compensation impairments and motion judder, that overcomes or ameliorates deficiencies of the prior art.

BRIEF DESCRIPTION OF THE DRAWINGS

Examples of the invention will now be described with reference to the drawings in which.

DETAILED DESCRIPTION OF THE INVENTION

Figure 1:
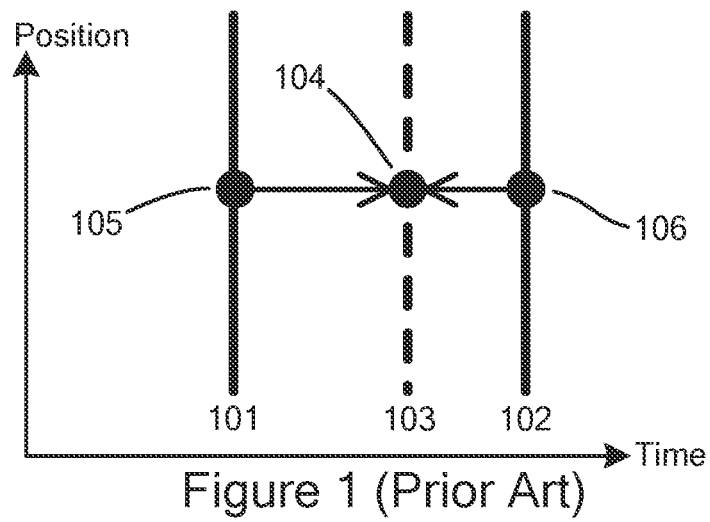
FIG. 1 is a diagram illustrating non-motion-compensated temporal interpolation between two input video frames according to prior art.
Figure 2:
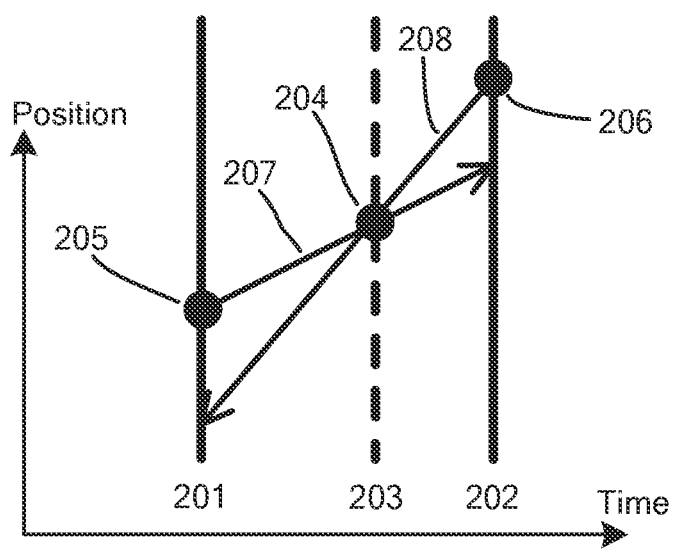
FIG. 2 is a diagram illustrating motion compensated temporal interpolation between two input video frames according to prior art.
Figure 3:
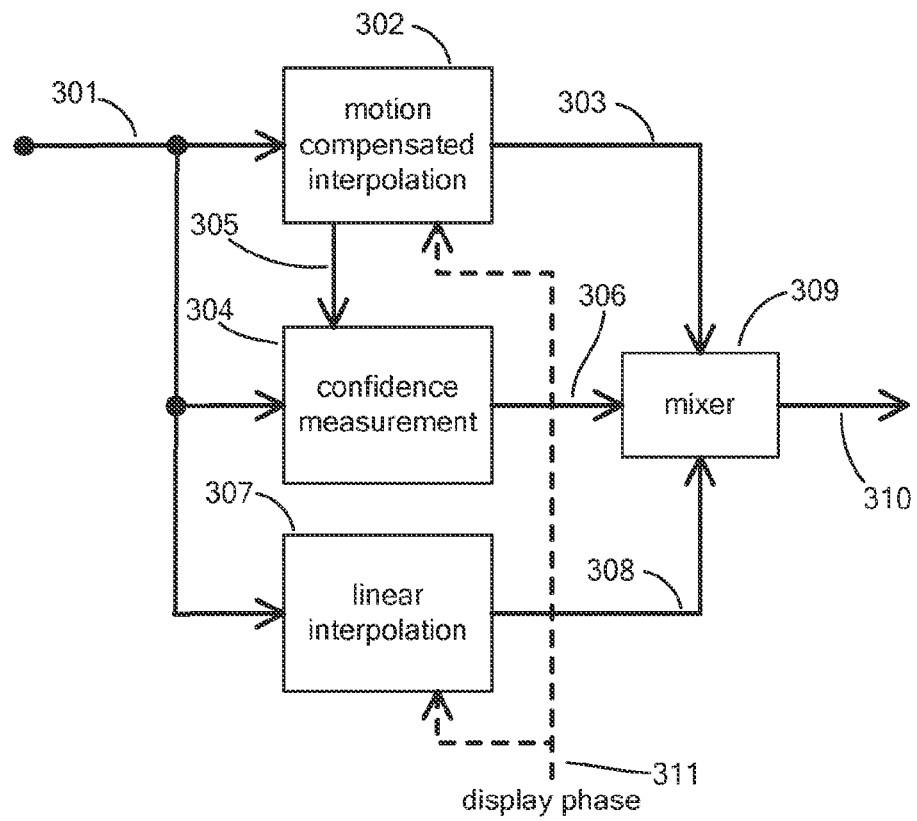
FIG. 3 is a block diagram of fallback processing according to prior art.

Referring again to FIG. 2, it will be noticed that the two motion vectors (207) and (208) are similar in magnitude (the difference possibly being due to acceleration, if preceding or subsequent frames were involved in the motion estimation process). However, as explained in the introduction, the magnitudes of the scaled motion vectors used in the projection process differ as a function of the difference in the time intervals between frames 201 and 203, and between frames 203 and 202. The magnitude of the scaled vector used for projection from frame 201 will be greater than that used for projection from frame 202. Consequently, the effects of any errors in the estimation of motion vector (207) will generally be worse than those arising from motion vector (208). In motion compensated interpolation, this tendency is taken into account by applying a higher weighting to pixel (206) than to pixel (205) in the interpolation mix. The combination of the difference in weighting and the difference in reliability of the two contributions to the output pixel has the outcome that the overall quality of the interpolation improves as the interpolated frame instant approaches one of the input frames.

In fallback processing according to the invention, we build an output frame closer in time to one of the input frames than the time at which it is displayed. In doing so, we improve the quality of the interpolated frame, at the expense of a spatial displacement between the expected and the actual position of moving objects at certain times, which manifests itself visually as motion judder. This is often an acceptable compromise, because motion judder is most objectionable when the observer can most easily track a moving object, but we are usually introducing it at times when motion is most difficult to track.

Figure 4:
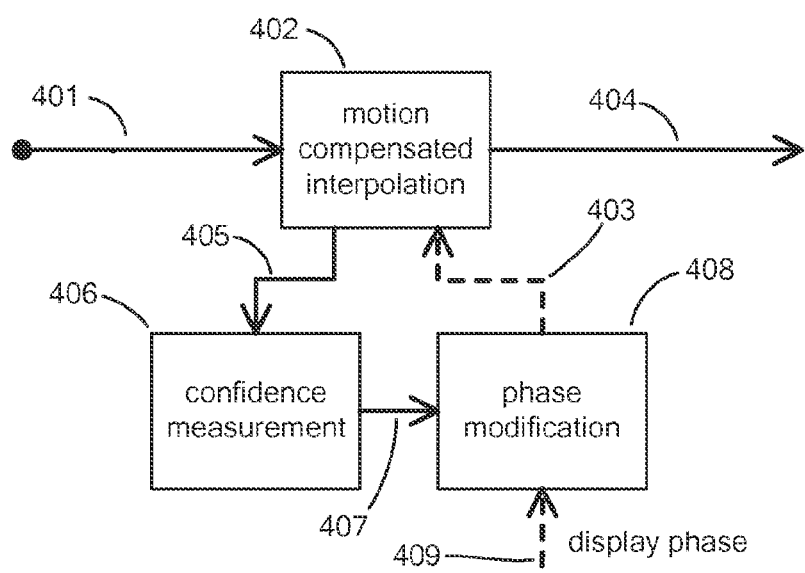
FIG. 4 is a block diagram of fallback processing according to the invention.

A first exemplary embodiment of the invention will now be described. Referring to FIG. 4, input video (401) is applied to a motion compensated interpolation process (402) to produce temporally interpolated output video (404) under the control of a display phase signal (403). Information (405) obtained from the motion compensated interpolation process (402) is used in a confidence measurement process (406) to produce a confidence level (407) for each output frame. The confidence level is used in a phase modification process (408) to modify the desired display phase (409) to produce a "built phase" (403) which is the phase value used by the motion compensated interpolation process (402).

Figure 5:
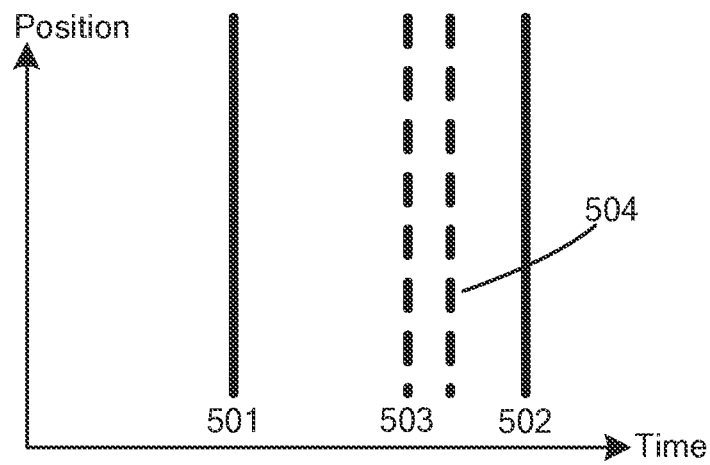
FIG. 5 is a diagram illustrating the relationship between display phase and built phase according to a first embodiment of the invention.

FIG. 5 illustrates an exemplary relationship between the display phase and the built phase for a particular confidence level. The display phase or the "required" phase is of course determined simply by the relative frame rates of the input frame sequence and the output frame sequence. It will typically cycle repeatedly through a range of phase values, the number of phase values in the range before the cycle repeats being of course determined by the relationship between the input and output frame rates. With respect to the input frames 501 and 502, the display phase for the output frame 503 in FIG. 5 has a value of 0.6. However, the built phase has, in this example, a value of 0.75, so that the output frame is built at the position (504) that is closer to the input frame 502. The output frame in this case, for a display phase of 0.6, will be identical to that which would be built by a prior art motion compensated interpolator at a display phase of 0.75. A feature of the invention is that the built phase is closer to the nearest input frame than the display phase. This means that if the display phase is greater than 0.5, the built phase will be greater than the display phase, whereas if the display phrase is less than 0.5, the built phase will be less than the display phase.

Figure 6:
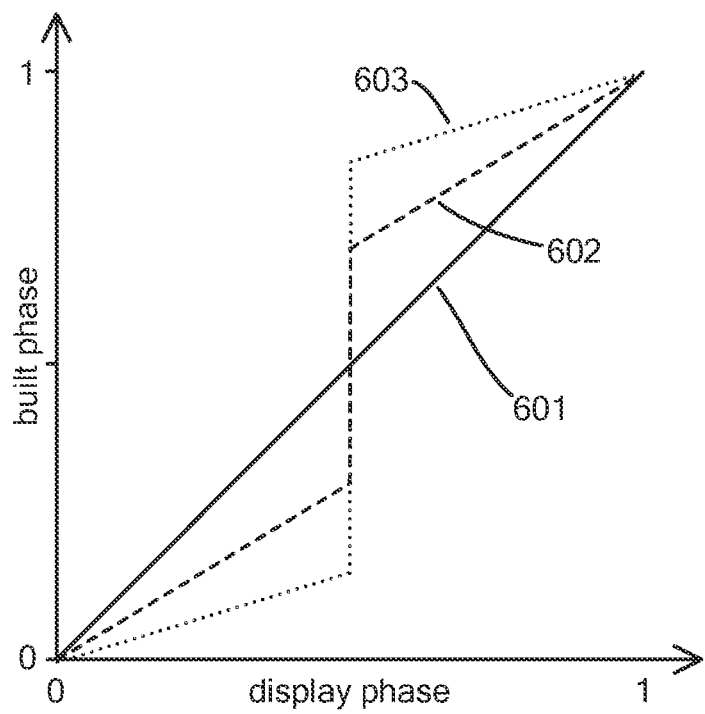
FIG. 6 is a family of graphs showing the relationship between display phase and built phase according to the invention.

FIG. 6 further illustrates the relationship between display phase and built phase, in the form of a family of graphs. Graph (601) shows the relationship when the confidence level is very high. No modification is made to the display phase, so the built phase is equal to the display phase. Graph (602) is an example of the relationship when the confidence level has a moderate value, and graph (603) is an example of the relationship when the confidence level is low. In general, as the confidence level decreases, the built frames become closer to input frames. The particular case of a display phase of 0.5 can be dealt with either by setting the built phase to 0.5, or by making an arbitrary decision to categorise the display phase as just less than, or just greater than, 0.5.

Exemplary methods of measuring the confidence and of calculating the built phase will now be described in detail. The confidence measurement depends on the methods of motion estimation and motion compensation being used. One way of assessing the confidence of a vector for a pixel is to find the 'displaced frame difference' (DFD) for the vector and pixel by subtracting the value of the pixel from the value of a pixel in another frame that is 'pointed to' by the vector. The DFD corresponds to a vector error and a small difference corresponds to high confidence.

When the well known block-matching method is used to derive motion vectors, the match error associated with a vector is similarly related to its confidence.

UK Patent Applications 1206067.9 and 1206065.3 describe methods of motion estimation which work by selecting motion vectors so as to minimise motion vector 'assignment errors' derived from DFDs, and include methods of finding assignment errors for forward and backward vectors. The minimized assignment error for each pixel gives a very local measure of motion estimation confidence for that pixel.

In the following example we calculate, using data from a motion estimation process, a confidence measure that is valid for the whole frame and the whole interval between two input frames.

For the purposes of this example, we take, as 8-bit unsigned numbers:

$h_f$, the set of forward assignment errors associated with the forward vectors assigned to the pixels of the previous frame; and, $h_b$, the set of backward assignment errors associated with the backward vectors assigned to the pixels of the next frame;

and we calculate an error value for the current frame:

$$H = \max_{9 blocks} \langle h_f + h_b \rangle \quad [1]$$

where the angled brackets indicate averaging, and the average is taken of each of 9 rectangular regions that tile the picture in a 3×3 arrangement. This value of H is therefore a worst-case average error taken over the nine regions. The skilled person will recognise that other suitable formulae for calculating a representative error value for the picture could be used without departing from the scope of the invention.

A confidence value $\alpha$ is then calculated as follows:

$$\alpha = \max\left\{0, \min\left\{1, \frac{H_{max} - H}{H_{max} - H_{min}}\right\}\right\} \quad [2]$$

where $H_{max}$ and $H_{min}$ are constants with the following typical values:

$H_{max}$=6.5 for high definition television (HD) pictures, or 13 for standard definition television (SD) pictures; and, $H_{min}$=2.5 for HD pictures, or 5 for SD pictures.

This formula gives a linear relationship between error H and confidence $\alpha$, scaled and clipped so that the confidence is 1 when $H \leq H_{min}$ and 0 when $H \geq H_{max}$. The skilled person will recognise that the relationship between error and confidence can be determined by any monotonically decreasing function without departing from the scope of the invention. Furthermore, the confidence may be calculated using information other than, or in addition to, motion vector assignment errors. For example, UK Patent Application GB 2 448 336 describes the measurement of confidence using the peak heights arising from a phase correlation process.

Given the confidence $\alpha$ and a display phase $\phi$, the phase modification process then calculates a built phase $\phi'$ by the following formula:

$$\phi' = \begin{cases} \alpha\phi & \phi \leq \frac{1}{2} \\ 1 - \alpha(1-\phi) & \phi > \frac{1}{2} \end{cases} \quad [3]$$

This formula gives a piecewise linear relationship between display phase and built phase, that depends on the confidence $\alpha$. Two examples are shown in FIG. 6, at (602) and (603). In each case the relationship comprises two linear segments, both having a slope $\alpha$, which is less than unity. When the display phase $\phi$ is less than or equal to ½, the display phase $\phi$ is attenuated by a constant $\alpha$; and, when the display phase $\phi$ is greater than ½, a constant positive offset is applied to the attenuated display phase so that when the display phase is unity, the built phase is also unity.

The skilled person will recognise that other functions could be used without departing from the scope of the invention. Furthermore, a direct calculation of built phase could be made within the motion compensated interpolation process without the explicit intermediate calculation of a confidence value.

A second embodiment of the invention will now be described. A potential shortcoming of the first embodiment is the use of a single phase value for the whole frame. Motion judder will thereby be introduced not only to the parts of the picture where the motion is complex and therefore difficult to track, and where judder is therefore not very perceptible, but also to other parts where judder may be more objectionable. A possible solution to this problem is to allow the built phase to vary smoothly with spatial position, as a function of a spatially varying confidence value. As mentioned previously, a DFD for a pixel is a confidence value at the spatial position of the pixel, and the modification of the built phase could be increased for pixels having high DFDs. However, it is important that such variation should not be too abrupt from one part of the picture to another; otherwise shapes of moving objects may appear distorted. Nevertheless, a mild variation, for example between the edges and the centre of the picture, might be beneficial. Or, a spatial low-pass filter could be applied to DFDs, or other motion estimation error measures for the pixels to obtain a spatially smoothly varying confidence value.

Figure 7:
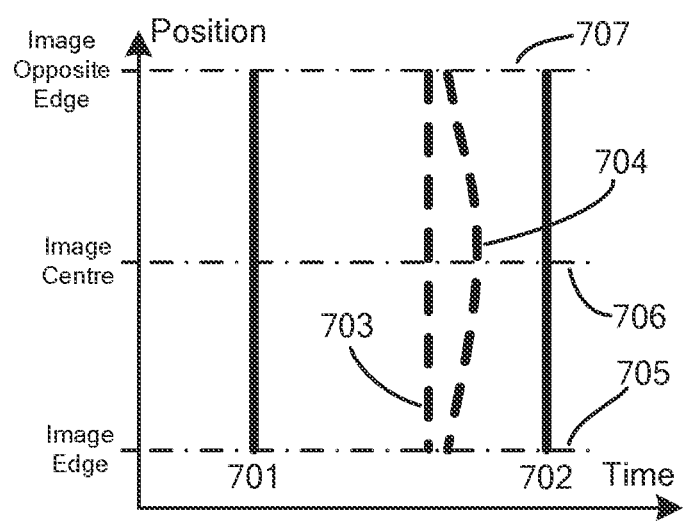
FIG. 7 is a diagram illustrating the relationship between display phase and built phase according to a second embodiment of the invention.

An example of possible variation, illustrated in one spatial dimension, is given in FIG. 7. The display phase is illustrated as a straight broken line (703) and has a phase of 0.6 with respect to the two input frames (701) and (702). The built phase is illustrated as a curved broken line (704). An image edge position (705), an image centre position (706) and an image opposite-edge position (707) are shown on the position axis of the Figure. The built phase (704) is greater at the image centre position (706) than at the two image edge positions (705) and (707). Of course, if the display phase were less than 0.5, the built phase at the image centre would be less than that at the image edges. Although FIG. 7 illustrates a one-dimensional modification of the built phase, the modification could be applied in two dimensions, by applying a smooth weighting function having no effect at the image centre and applying a smaller change to the built phase close to any image edge.

A third embodiment of the invention will now be described. In this embodiment, the benefits of building pictures at times closer to the input frames than the desired display times are considered to outweigh permanently the drawbacks of introducing judder. The system is therefore run in full "fallback mode" all the time, which can be achieved in either of the first two embodiments by setting the confidence to a minimum value so that the output pictures are always built at phase values close to zero or unity.

A fourth embodiment of the invention will now be described. In this embodiment, we exploit the possibility that building pictures closer to input pictures may also be beneficial even if there is no motion compensation. This can be achieved by removing motion compensation from any of the above embodiments so that output pictures are built by simple interpolation using weighted sums of input pixel values from input images that have not been shifted by motion vectors.

As the skilled person will appreciate the invention can be implemented in many ways, including: a real time process with streaming input and output image data; a process that interpolates stored image data at an arbitrary rate; and/or in the form of instructions for a programmable data processing device.

The spatial sampling structure of the images is not relevant to the invention, for example, in interlaced television, successive images have different vertical sample structures.

The invention claimed is:

1. A method of interpolating images to create, from a sequence of input images ordered at regular input image positions, a sequence of output images to be presented at regular output image positions, the method comprising the steps in a video processor of:
   receiving an ordered sequence of input images; and
   interpolating from at least two input images to obtain a new image for a required output image position that does not align with any input image position;
   wherein interpolation-related impairments are reduced by interpolating at least part of the said new image at a position that is offset from the required output image position.

2. A method according to claim 1 where the interpolated images are presented to an observer in a regular sequence and at least part of an interpolated output image is interpolated at a position that is offset from its presented position.

3. A method according to claim 1 or claim 2 in which the said interpolation is temporal interpolation.

4. A method according to claim 1 in which the direction of the said offset is towards the input image that is nearest to the said required position of the interpolated output image.

5. A method according to claim 4 in which the said offset is reduced in dependence on the proximity of the said nearest input image to the said required position of the interpolated output image.

6. A method according to claim 1 in which the said offset is constant across each interpolated output image.

7. A method according to claim 1 in which the magnitude of the offset depends on a measure of interpolation confidence.

8. A method according to claim 7 in which the said offset varies smoothly over each interpolated output image as a function of a spatially varying interpolation confidence value.

9. A method according to claim 7 in which the confidence is calculated from a measure selected from the group of measures consisting of: peak heights in a correlation surface; motion vector assignment errors and block-matching match errors.

10. A method according to claim 1 in which the magnitude of the offset depends on a measure of interpolation confidence.

11. Apparatus for interpolating images to create, from a sequence of input images ordered at regular input image positions, a sequence of output images to be presented at regular output image positions, comprising:
    an interpolation unit receiving a phase control signal and configured to interpolate a new image at a position between two input images which is determined by the phase control signal;
    a confidence measurement unit for providing an interpolation confidence measure; and
    a phase modification unit configured to modify the phase control signal in dependence upon the interpolation confidence measure.

12. Apparatus according to claim 11, wherein said modification of the phase control signal serves to offset the position at which at least part of the said new image is interpolated toward the position of the closer of said two input images as said interpolation confidence measure reduces.

13. Apparatus according to claim 11, further comprising:
    a motion measurement unit configured to generate motion vectors from said input images, each motion vector having a vector confidence value representing the accuracy of that motion vector;
    wherein said interpolation unit comprises a motion compensated interpolation unit configured to use a plurality of said motion vectors to interpolate said new image; and
    wherein said interpolation confidence measure is derived from said vector confidence values.

14. Apparatus according to claim 12 in which the said offset is reduced in dependence on the proximity of the said closer input image to the required position of the interpolated output image.

15. Apparatus according to claim 12 in which the said offset is constant across each interpolated output image.

16. Apparatus according to claim 12 in which the said offset varies smoothly over each interpolated output image as a function of a spatially varying confidence value.

17. Apparatus according to claim 13 in which the vector confidence value is calculated from a measure selected from the group of measures consisting of: peak heights in a correlation surface; motion vector assignment errors and block-matching match errors.

* * * * *